United States Patent
Knabel et al.

(10) Patent No.: US 6,401,444 B1
(45) Date of Patent: Jun. 11, 2002

(54) BEARING COMPOSITION FOR A OPEN-END SPIN ROTOR

(75) Inventors: Manfred Knabel; Edmund Schuller, both of Ingolstadt; Erich Bock, Wettstetten, all of (DE)

(73) Assignee: Rieter Ingolstadt Spinnereimaschinenbau AG, Ingolstadt (DE)

( * ) Notice: Subject to any disclaimer, the term of this patent is extended or adjusted under 35 U.S.C. 154(b) by 0 days.

(21) Appl. No.: 09/663,975

(22) Filed: Sep. 19, 2000

(30) Foreign Application Priority Data

Oct. 26, 1999 (DE) .......................... 199 51 640
Mar. 24, 2000 (DE) .......................... 100 14 861

(51) Int. Cl.[7] .............................. D01H 4/12
(52) U.S. Cl. ........................ 57/404; 384/121
(58) Field of Search .................. 57/404; 384/121

(56) References Cited

U.S. PATENT DOCUMENTS

| | | | |
|---|---|---|---|
| 3,652,409 A | * 3/1972 | Mack et al. ........... | 252/12 |
| 5,098,205 A | 3/1992 | Zehndbauer et al. | |
| 5,126,610 A | 6/1992 | Fremerey | |
| 5,179,153 A | * 1/1993 | George ............... | 524/495 |
| 5,275,493 A | 1/1994 | Ide | |
| 5,730,532 A | 3/1998 | Knabel et al. | |
| 5,845,997 A | 12/1998 | Kinno et al. | |
| 6,106,936 A | 8/2000 | Adam | |

FOREIGN PATENT DOCUMENTS

| | | |
|---|---|---|
| DE | AS1140847 | 12/1962 |
| DE | 2632976 | 1/1978 |
| DE | 2818184 | 11/1980 |
| DE | 3050056 C1 | 6/1988 |
| DE | 4227909 A1 | 2/1994 |
| DE | 2366046 | 6/1997 |
| DE | 19808540 A1 | 9/1999 |
| DE | 19936646 A1 | 2/2000 |
| DE | 19859104 A1 | 6/2000 |
| GB | 1415100 | 11/1972 |

OTHER PUBLICATIONS

European Patent Office Search Report, Feb. 26, 2001.
Search Report by German Patent Office, Jul. 19, 2000.
Ullman's Encyclopedia of Industrial Chemistry, Fifth Edition, vol. A 21.
Selbstschmierende und wartungsfreie Gleitlager, 1993.
Hochtemperaturbestandige Kunststoffe, E. Meckelburg, Jun. 1974.

* cited by examiner

Primary Examiner—Andy Falik
(74) Attorney, Agent, or Firm—Dority & Manning

(57) ABSTRACT

An open-end spinning apparatus has a spin rotor (1) which, by means of its shaft (11) is supported by support plates (4), wherein as an abutment for the axially directed force on the spin rotor (1), an aerostatic axial bearing (6) is provided. The bearing surface (115) of the spin rotor (1) operates together with a bearing plate (63) of the axial bearing (6). The bearing surface (115) or the bearing plate (63) are comprised of a construction material of polyimide. Advantageously, the polyimide is combined with an additive, namely graphite, for instance.

20 Claims, 1 Drawing Sheet

BEARING COMPOSITION FOR A OPEN-END SPIN ROTOR

BACKGROUND

The present invention concerns an open-end spinning apparatus with a spin rotor. For the bearing of open-end spin rotors on an open-end spinning apparatus, it is a known practice, to carry the spin rotor radially by its shaft on support plates to provide an aerostatic bearing in the axial direction. Such a bearing system has been made known by EP 0 435 016 A2. The aerostatic axial bearing possesses a bearing plate, which coacts with a shaft end opposite the rotor. In this case, the air flow of compressed air into a bearing gap occurs penetratively through the bearing plate. Between the rotor shaft and the bearing plate, this air flow provides an air cushion, which is maintained between the rotor shaft and the bearing plate. By this means, an abrasion-free axial bearing support of the rotor shaft is made possible. In the case of this open-end apparatus, the bearing plate is composed of a carbon based material, the bearing surface of which is flat, offers little friction, and possesses a certain measure of durability. Where carbon materials are concerned, one is chiefly dependent upon bonded carbon graphite, which shows an especially low degree of friction generation.

In normal operation between the rotor shaft and the bearing plate, there is no contact, so that a wear-free axial bearing is achieved. Nevertheless, when operational upsets occur, contact between the end of the shaft and the bearing plate of the aerostatic axial bearing does occur. These somewhat rough conditions, for example, are caused in part by imbalance in the spin rotor because of lack of roundness of the support accessories or by the drive belting becoming worn. A contact between the end of the shaft and the bearing plate of the aerostatic axial bearing does not necessarily mean a failure of the bearing, or that the aerostatic bearing is damaged. The carbon material forms a low frictional pairing with the end of the shaft, which latter is metallic, for instance steel.

Thus many impacts may occur between the rotor shaft and the bearing plate before any damage to the axial bearing takes place. The conventional axial bearings for open-end spin rotors still have the disadvantage, that, especially at high rotational speeds, wear can occur in the area of the axial bearing of the spin rotor, whereby the life of the bearing is limited.

DE 197 05 607 A1 discloses a practice of carbide coating the surface of a rotor shaft working in conjunction with an aerostatic bearing. What is achieved with this is that wear on the bearing plate is substantially diminished. This leads to the supposition that a carbon based material, together with a contact partner of carbide, would lead to an improved, low friction combination of materials. In spite of this, the lifetime duration of the pneumatic bearing remains limited. Especially upon further increase in the RPM of the open-end spin rotors and the increasingly unfavorable operational conditions, a reduction in the lifetime of the known pneumatic axial bearings can be experienced.

SUMMARY OF THE INVENTION

Thus, a purpose of this invention is to design an open-end spinning apparatus in such a manner that the lifetime of the axial bearing is essentially increased, and to design a spin rotor for an open-end spinning apparatus. Additional objects and advantages of the invention will be set forth in part in the following description, or may be obvious from the description, or may be learned through practice of the invention.

The present purposes are achieved, in accord with the invention, by the designing of an open-end spinning apparatus wherein a spinning rotor, which is carried by its shaft which shaft rests upon support plates, upon which shaft an axial force is exerted and which, by means of an end bearing surface, is axially abutted by an aerostatic bearing, wherein the bearing surface of the spin rotor coacts with the bearing plate of the axial bearing, and the bearing surface and/or the bearing plate is made from a construction material of polyimide.

By the use of the material polyimide, a material pairing is obtained at the axial bearing, which has a low frictional value, is not sensitive to temperature, and is especially resistant to mechanical demands. By means of this arrangement, an axial bearing is obtained with a high structural strength, and the material used has a high modulus of elasticity. These advantages in turn, become qualities of the bearing surfaces or the bearing plate. Besides the required necessary favorable friction characteristics, in an advantageous manner, also an especially high mechanical load capacity is made possible. By this advantage, the negative actions of mechanical contact between the bearing surface and the bearing plate are substantially lessened.

This bearing material is capable of not only standing up to the mechanical demand during operation, but also resists damage during the insertion of the bearing plate, whereby fabrication errors are lessened and thus contributing to improvement of the bearing system.

Moreover, polyimide materials are high in workability, whereby the maintenance of dimensional tolerances are assured during fabrication. This brings about an advantage in which the durability of the bearing is improved. Consequently, in a simple and confident manner, a precise fabrication becomes possible to carry out in accord with predetermined specifications. Advantages also arise from the fact that the bearing plate or the bearing surface of the spin rotor possesses a correspondingly effective coating with polyimide. In this operation, the bearing plate can carry the coating or, in reverse, the bearing surface of the spin rotor, that is, the free end of the rotor shaft, is coated with polyimide.

Advantageously, the bearing surface for the aerostatic bearing at the shaft end can be designed in the form of an insert of polyimide on that shaft end. This was made known in FIG. 9 of EP 0 435 016 A2.

In an advantageous development of the invented axial bearing, the polyimide material receives an additive, which is especially effective if this is graphite. Preferably, the graphite portion is between 10 and 40 wt %, more advantageously this can be more than 40 wt %. Thereby a particularly favorable, that is a lower, friction value of the bearing material is achieved, whereby the abrasion by mechanical contact between the bearing surface and the bearing plate is further reduced.

In an advantageous development, the polyimide receives an additive in a preferred portion of 10 wt % of Teflon®. Advantageously also the polyimide material can be used simultaneously with an addition of graphite and Teflon®. In this case, the apportionment of graphite is favorably between 10 and 20 wt % and the Teflon® portion between 5 and 15 wt %. Besides this, advantageously the bearing material of polyimide can receive an additive of molybdenum sulfide ($MOS_2$), serving particularly for the further reduction of the friction.

Likewise, a further advantageous and inventive embodiment of an open-end spinning apparatus is achieved by the use of a carbon based bearing material, to which polyimide has been added. This material provides a substantial increase in operating life for the open-end spinning apparatus. By the addition of polyimide, abrasive resistance is considerably increased. When this is done, at the same time, mechanical strength is substantially increased and brittleness is reduced. By this means, impacts, to which the pneumatic bearing is subject, are better withstood. Beyond this, the advantages of the favorable characteristics of carbon are retained when it is used as the material for the pneumatic axial bearing for open-end spinning rotors.

In an advantageous development of the invention, the bearing-plate possesses one or more openings or borings for the passage of air. In this way, a simple and secure supply of air for the bearing gap is attained. A plurality of such borings can advantageously be placed in the form of a circle. In a particularly good improvement of the invention a choke, most preferably made of a sinter material, is provided, and is placed in front of the entry of the air into the bearing gap, that is, it is placed in the air supply line. Particularly advantageous is that the end of the rotor shaft opposite to the spin rotor is itself designed as a bearing surface which coacts with the bearing plate. It is also favorable, that the back side of the bottom of the rotor or parts thereof, may be designed as a bearing surface, as made known by the German Patent Application 198 59 104.7. Correspondingly advantageous is a formulation of the spin rotor with a bearing surface of polyimide.

In a particularly advantageous development of the invention, the bearing plate made of polyimide operates together with a bearing surface of carbide. Equally well, the bearing surface can be of another material, for instance steel, which is subsequently coated with carbide. The carbide joins with the polyimide to produce a particularly favorable material pair, insofar as its relationship to abrasion and operational life is concerned. The axial bearing plate of the axial operates equally well, when this is made of carbide or has a carbide coating and works together with bearing surface of polyimide.

Particularly favorable for the development of an open-end spinning apparatus is the combination of a bearing plate at the axial bearing made of polyimide with a spin rotor which has a bearing surface coated with carbide.

Preferably, the carbide is silicon carbide, i.e. a coating of silicon carbide. In a further advantageous embodiment, the surface of the carbide or the carbide coating on the bearing plate or on the bearing surface is designed to a nominal thickness of less than 3 $\mu$m, although particularly preferred is a nominal thickness of less than or equal to 1 $\mu$m.

In the following, the invention will be more closely described and explained with the aid of drawings. There is shown in:

DETAILED DESCRIPTION

Reference will now be made in detail to embodiments of the invention shown in the figures. Such embodiments are provided by way of explanation of the invention, and not as a limitation of the invention. For example, features illustrated or described as part of one embodiment may be used with another embodiment to yield still a further embodiment. It is intended that the present invention include modifications and variations to the embodiments described herein.

Figure 1:
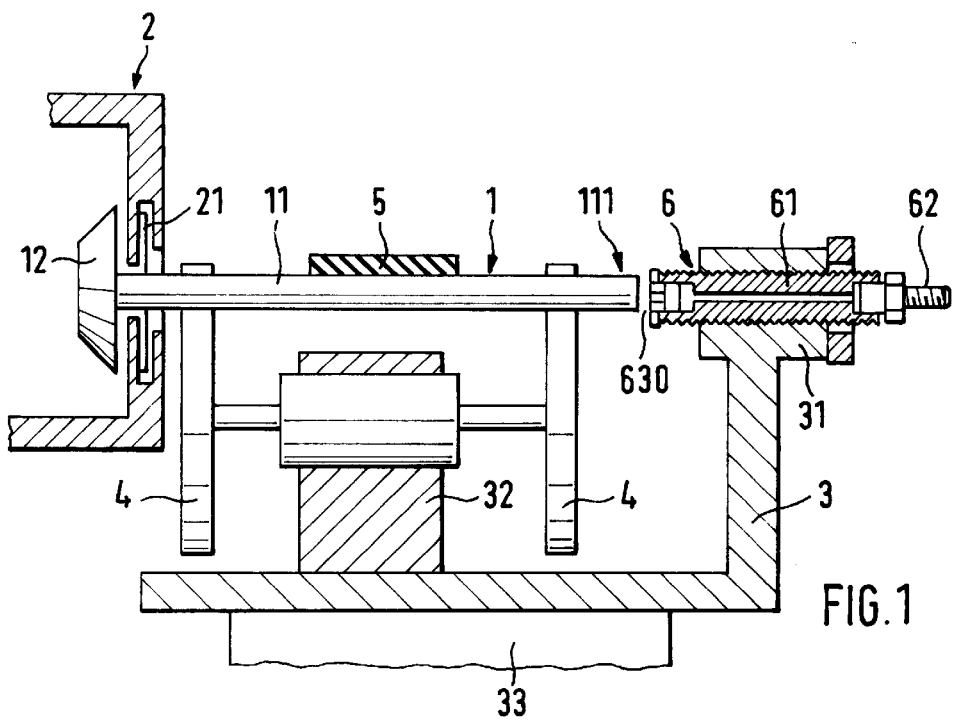
FIG. 1 an open-end spinning apparatus in sectional view.

In FIG. 1, an open-end spinning apparatus constructed in accord with the invention is shown with a spin rotor also in accord with the invention. Both are shown in cross-section. The important components of the open-end spinning apparatus are as follows:

the spin rotor 1, the shaft 11 of said spin rotor, the rotor plate 12, the rotor housing 2 with the rotor housing closure seal 21, the bearing support 3, the holder block 31 for receiving the axial bearing 6 and a receiving block 32 for the support plates 4.

The receiving block 32 forms a base for the support plates 4, which in turn receive the rotor shaft 11. Further, the driving means 5 is a tangential belt, and the axial bearing 6 is shown for the axial support of the rotor shaft 11.

Figure 5:
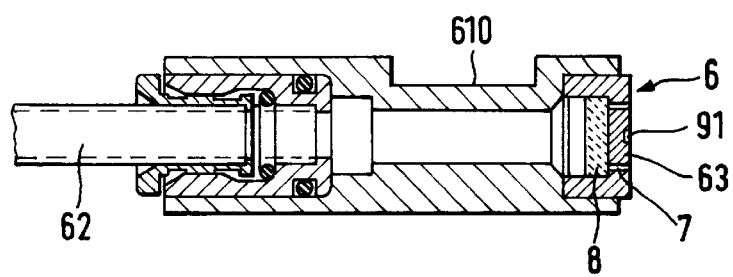
FIG. 5 an alternative embodiment, of the axial bearing in cross-section.

The rotor shaft 11 penetratingly extends with its end carrying the rotor into the rotor housing 2 through a boring in the rotor housing seal 21. The axial bearing 6 is inserted into a positioning screw 61, and lies opposite to the free end 111 of the rotor shaft 11. An alternative arrangement of the axial bearing 6 not employing a positioning screw is shown in FIG. 5.

The block 31 for accepting the axial bearing 6 possesses a boring with a female threading, into which the positioning screw 61 engages. The positioning screw 61 is axially adjustable. A lock nut serves for setting the positioning screw 61 at a desired location. On the other end of the positioning screw 61 is placed a fitting 62 for the admission of compressed air to the axial bearing 6.

Between this axial bearing 6 and the free end 111 of the rotor shaft 11 is located the bearing gap 630. Even in the case of generic type open-end spinning apparatuses, an axial force is engendered, which is abutted at the free end 111 of the rotor shaft 11. The axial force on the rotor and rotor shaft, in the case of the open end spinning apparatus depicted in FIG. 1, is generated in a known manner by the inclined support plates 4. It is also possible, and equally of value, to bring about the axial force by running drive belts, which are aligned at an angle or even an angularly set pressure or driving plate. The open-end spinning apparatus itself is supported on the block 33, which is affixed to the correlated spinning machine.

Figure 2A:
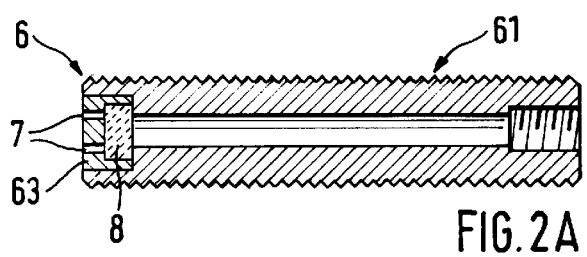
FIG. 2A a section through the axial bearing.

FIG. 2A shows the positioning screw 61 and a bearing plate 63 placed within, making up an aerostatic axial bearing 6 in accord with the invention. For the emission of the air into the bearing gap 630, the bearing plate 63 possesses a plurality of borings 7. A choke device 8, which is made of a sintered material is inserted first into the boring, whereby the bearing is given a high degree of structural strength, since the short columns of air in the borings 7 are scarcely compressible.

Figure 2B:
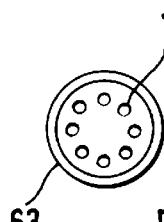
FIG. 2B a top view onto the bearing plate of the axial bearing.

FIG. 2B shows the bearing plate 63 of FIG. 2A in a plan view. The borings 7 are coaxially, equally apportioned The bearing plate 63 is comprised of polyimide.

For improvement of the characteristics of the polyimide, the material can receive one or more additives, which are appropriate for bettering the characteristics of the bearing materials. Thus, it is particularly of advantage to add graphite to the polyimide, or even, to bring the polyimide into contact with graphite or with Teflon®, this being polytetrafluoroethylene.

The bearing plate 63 of FIG. 2B, as may be inferred from the FIG. 2A, is pressed into a boring in the positioning screw 61. The mechanical stresses on the bearing plate 63, which arise therefrom, can be borne by its favorable characteristics due to the basic materials of its construction. Even the pressing in of the choke 8 into the bearing plate is possible because of the mutual structural strength of the choke and bearing plate.

Figure 3:
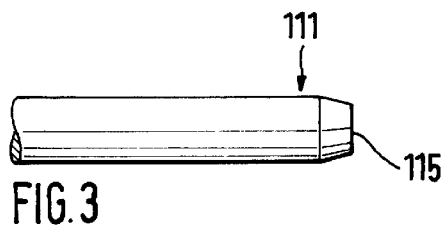
FIG. 3. the free end of the rotor shaft.

FIG. 3 depicts a shaft end 111, developed in accord with the invention, which coacts with the bearing plate of the axial bearing. The shaft end 111 possesses a flat ground bearing surface 115, which is coated with polyimide. The coating possesses, in this service, such a thickness as to allow its favorable characteristics for an axial aerostatic bearing to become evident. The bearing surface created in this way, coacts with a bearing surface of a corresponding axial bearing; so that the bearing plate, in its most simple form, can be a metal plate, which is provided with one or more, borings 7, designed similar to those of FIG. 2B, to allow the entry of air into the bearing gap 630.

In another embodiment of the axial bearing, in which the bearing plate is comprised of polyimide, the shaft end 111, that is, its flat ground bearing surface 115, is coated with silicon carbide. The nominal thickness is something less than 3 µm, preference is given to only 1 µm or even less. A combination of the materials yields a particularly abrasion resistant axial bearing with a long operational life for an open-end spinning apparatus.

For the easier exchange of the spin rotor 1, the shaft end 111 in the area of the surface 115, is chamfered to a somewhat smaller diameter than the rest of the rotor shaft 11. By means of this diameter reduction, the rotor shaft 11, upon being set into the rotor bearing of the open-end spinning apparatus can now be more easily slipped into the wedge-like opening of the support plates 4.

Figure 4:
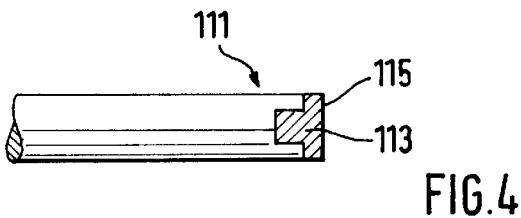
FIG. 4 a rotor shaft with an end insert as bearing surface of the rotor.

FIG. 4 shows the free end 111 of a rotor shaft, in accord with the invention, wherein the said shaft carries an insert 113, which is made of polyimide. The insert 113 is retained by means of an appropriate binding material, i.e. an adhesive, in the correspondingly prepared end of the rotor shaft. The bearing surface 115 shown in FIG. 4, is designed to be ground flat and is similar to the bearing surface 115 which emerged from a coating as shown in FIG. 3. Likewise, too this bearing surface of FIG. 4 has an appropriate nominal thickness. This assures, together with the polyimide, that only very low abrasive loss will occur on the bearing plate with the rotor shaft, or rather on the insert 113 thereof, with which the bearing plate coacts.

Besides the embodiment shown in FIG. 4 of an insert 113, this insert 113 can be attached to the shaft without a forced shape fit. To bring this about, the insert 113, having a flat surface, can be brought onto the like prepared surface of the rotor shaft end. The fastening can be, when this is done, likewise by means of an adhesive.

FIG. 5 shows yet another embodiment of a support holder for an axial bearing 6. With this embodiment of the axial bearing 6, the holder 31 receives no threading, but, in the device shown in FIG. 5, it is retained by a (not shown) screw on the machine framing and so is clamped over the surface 610. The air feed for the bearing gap is carried out as shown in FIG. 1, by means of the fitting 62. The bearing plate 63 possesses likewise borings 7 for the passage of air into the bearing gap. Directly before the borings 7, a choke 8 is placed, in order to increase the structural strength of the aerostatic axial bearing. The bearing plate 63 possesses for the reception of the choke 8 a boring, which accommodates the choke. On its side proximal to the rotor shaft, the bearing plate 63 has an abrasion device 91 in the form of short, blind boring, which is appropriate to monitor the wear on the bearing plate 63.

It should be appreciated by those skilled in the art that various modifications and variations can be made to the embodiments of the invention described herein without departing from the scope and spirit of the invention as set forth in the appended claims and their equivalents.

What is claimed is:

1. An open-end spinning machine, comprising:

a spinning rotor carried by a shaft, said shaft supported upon support plates and acted upon by an axial force, said shaft comprising an end bearing surface at an end thereof opposite from said spinning rotor;

an aerostatic bearing disposed so as to be spaced from and axially aligned with said shaft end bearing surface, said aerostatic bearing including a bearing plate that axially faces said shaft bearing surface and defines an air bearing gap therebetween; and wherein at least one of said bearing plate and said shaft bearing surface is formed at least in part by a material comprising polyimide and the other of said bearing plate and said shaft bearing surface is formed at least in part by a carbide material.

2. The open-end spinning machine as in claim 1, further comprising an additive added to said polyimide material.

3. The open-end spinning machine as in claim 2, wherein said additive comprises graphite.

4. The open-end spinning machine as in claim 3, wherein said graphite is greater than about 40% by weight of said material.

5. The open-end spinning machine as in claim 2, wherein said additive comprises PTFE.

6. The open-end spinning machine as in claim 2, wherein said additive comprises molybdenum sulfide.

7. The open-end spinning machine as in claim 2, wherein said additive comprises any combination of graphite, PTFE, and molybdenum sulfide.

8. The open-end spinning machine as in claim 1, wherein said bearing plate comprises at least one bore defined therethrough for the passage of air to said air gap.

9. The open-end spinning machine as in claim 8, wherein said bearing plate comprises a plurality of bores disposed in a generally circular pattern.

10. The open-end spinning machine as in claim 8, further comprising a choke device disposed before said bore in a direction of travel of air through said bearing plate.

11. The open-end spinning machine as in claim 10, wherein said choke device is formed from an air-permeable sintered material.

12. The open-end spinning machine as in claim 1, wherein said shaft bearing surface includes said polyimide material.

13. The open-end spinning machine as in claim 12, wherein shaft comprises a polyimide material insert attached to said end thereof, said insert defining said bearing surface.

14. The open-end spinning machine as in claim 1, wherein said shaft bearing surface includes said polyimide material and said bearing plate includes said carbide material.

15. The open-end spinning machine as in claim 1, wherein said bearing plate is coated in said carbide material.

16. The open-end spinning machine as in claim 15, wherein said carbide material is silicon carbide.

17. The open-end spinning machine as in claim 15, wherein said carbide material has a thickness generally less than about 3 um.

18. The open-end spinning machine as in claim 1, wherein said bearing plate includes said polyimide material and said shaft bearing surface includes said carbide material.

19. The open-end spinning machine as in claim 18, wherein said carbide material is silicon carbide.

20. The open-end spinning machine as in claim 10, wherein said carbide material has a thickness generally less than about 3 um.

* * * * *